No. 780,493. PATENTED JAN. 24, 1905.
N. P. CARVER.
MERCURY FEEDER FOR STAMPER BATTERIES, &c.
APPLICATION FILED MAR. 24, 1904.

2 SHEETS—SHEET 1.

Witnesses: Inventor.
Nicholas P. Carver
by Kummler & Kummler
Associate Attorneys No. 780,493. PATENTED JAN. 24, 1905.
N. P. CARVER.
MERCURY FEEDER FOR STAMPER BATTERIES, &c.
APPLICATION FILED MAR. 24, 1904.
2 SHEETS—SHEET 2.
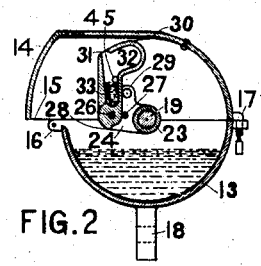
FIG. 2
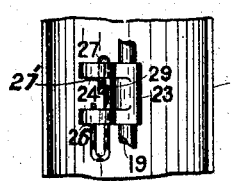 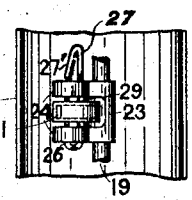
FIG. 5   FIG. 4
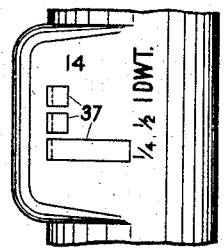 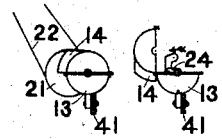
FIG. 8   FIG. 11  FIG. 12
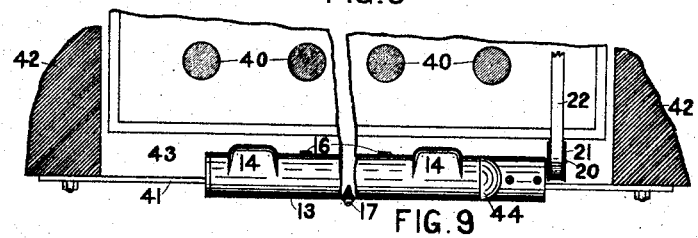
FIG. 9
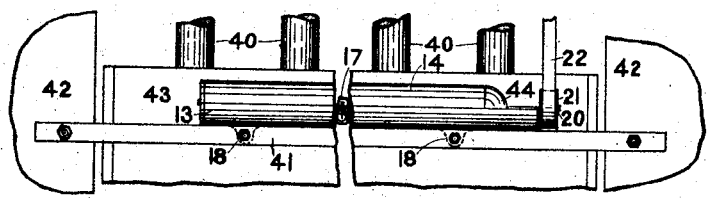
FIG. 10
Witnesses:
Percy Newell
N. J. Handrick
Inventor:
Nicholas P. Carver.
per Fred Walsh
Attorney.

No. 780,493. Patented January 24, 1905.

UNITED STATES PATENT OFFICE.

NICHOLAS P. CARVER, OF EDGECLIFFE, NEAR SYDNEY, NEW SOUTH WALES, AUSTRALIA.

MERCURY-FEEDER FOR STAMPER-BATTERIES, &c.

SPECIFICATION forming part of Letters Patent No. 780,493, dated January 24, 1905.

Application filed March 24, 1904. Serial No. 199,891.

*To all whom it may concern:*

Be it known that I, NICHOLAS PRICE CARVER, mechanical engineer, a subject of the King of Great Britain, residing at Edgecliffe, near Sydney, in the State of New South Wales and Commonwealth of Australia, have invented a new and useful mercury-feeder for stamper-batteries, adaptable also for the supplying of liquid and discrete materials in measured quantity at regular intervals and otherwise, of which the following is a specification.

The main objects of my invention are to provide an improved feeding device for supplying mercury in certain predetermined quantity and at regular intervals to the mortar-boxes of stamper-batteries of amalgamators and to provide means for controlling the quantity of mercury delivered and the intervals of time between each delivery.

My invention is shown as applied to a mercury-feeding device; but it will be understood that it would be also adapted for feeding liquids or other free-flowing materials—as, for instance, for supplying lubricants to machines, for supplying disinfectants to cisterns, or for delivering free-flowing materials from coin-operated vending-machines.

I accomplish these objects by the device shown in the accompanying drawings, which illustrate my invention as applied to a mercury-feeder connected with the mortar-box of an ordinary stamper-battery.

Figure 1:
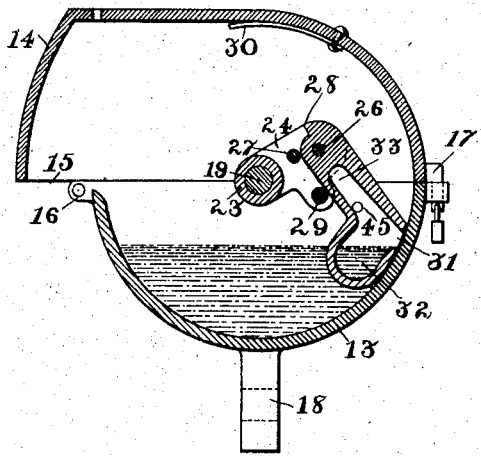
Figure 3:
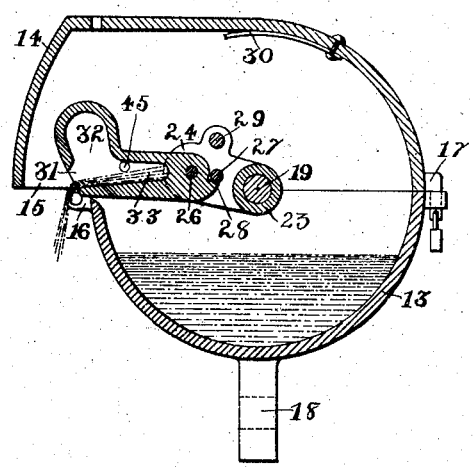
Figure 7:
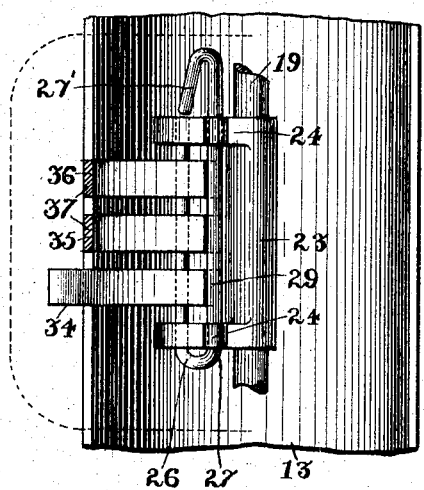
Figure 6:
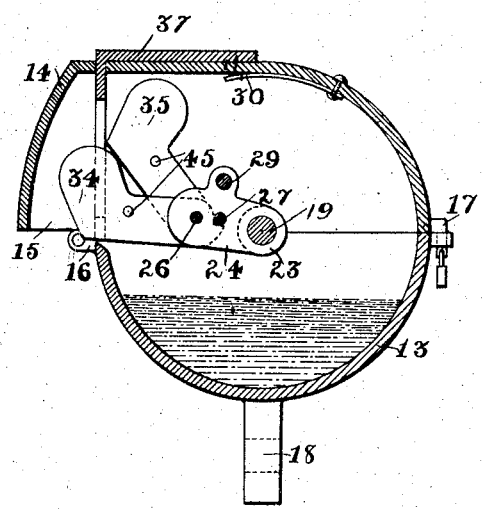

Figures 1, 2, and 3 are transverse vertical sections of a mercury-feeder, showing the feeding-scoop, respectively, in its filling, measuring, and discharging positions. Fig. 4 is a top plan of a feeder having a single scoop, the cover of the casing being removed. Fig. 5 is the same as Fig. 4 with the scoop removed. Fig. 6 is a transverse vertical section of a feeding device having a plurality of scoops, one of the same being shown in its inoperative position. Fig. 7 is a top plan of the same with the cover of the casing removed. Fig. 8 is a top plan of the cover of the casing, showing the indicator thereon. Fig. 9 is a top plan, on a smaller scale, of the feeder-trough, showing the same in position near the stamper-battery of an amalgamator, the middle part being broken away. Fig. 10 is a front elevation of the structure shown in Fig. 9. Fig. 11 is a reduced end view of the mercury-feeder with the casing closed. Fig. 12 is the same with the casing open and omitting the driving-pulley.

In the construction shown the casing 13 may be of any length, depending upon the location and number of feeders required. The casing 13 consists of a trough of semicircular cross-section having a cover of similar section hinged thereto at 16. The cover of the trough 13 is enlarged to form a hood 14 over each set of feeding mechanism, the hood being extended toward one side from the edge of the trough 13 and having a discharging-aperture 15, through which the mercury is delivered. The trough and cover are provided with lugs 17 on the side opposite the hinge 16 for locking the cover in a closed position. The trough is also provided with lugs 18 for securing the same to a convenient support.

A shaft 19 extends longitudinally and centrally through the trough 13 and is journaled in the bearings at its ends. Rigidly secured to the shaft 19 within the casing are a plurality of arms or carrier members 23, to which the feeding-scoops are attached. Each of the carriers 23 has a pair of transversely-extending cheeks 24, between which the feeding-buckets or scoops are pivotally mounted on an axis parallel with the shaft 19.

The two wings or cheek-pieces are each provided with two small holes to receive a staple-shaped piece of wire, one leg of which is somewhat longer than the other, so as to admit of being bent back upon itself to form a clasp engagement with one of the wing-holes, which is made slightly larger for this purpose. The end 27' of the leg 27 of the wire is adapted to spring outwardly after passing through the hole in the right-hand cheek when the spindle is pushed home. The end 27' may be pressed against the leg 27 of the wire when it is desired to shift the wire to a position shown in Fig. 5 for the purpose of removing the scoop. The pivotal movement of the scoop on the leg 26 is limited in one direction by means of the stop 28, which engages the second leg 27 of the wire. Movement of the scoop in the opposite direction is limited by the yielding stop or driver 29, which preferably consists of a steel spiral extending between the cheeks 24. The shaft 19 is rotated in the direction of the arrow on Fig. 12 by means of suitable gearing, which is connected with other parts of the stamping-battery by means of a belt 22.

The interior cavity of the feeding-scoop consists of two communicating compartments 32 and 33, disposed at an angle with each other and having a mouth 31 extending through the wall of the scoop. The branch 32 serves as a scoop for gathering and lifting the mercury, while the branch 33 forms a measuring-pocket for limiting the quantity of mercury discharged at each revolution of the scoop. The capacity of the measuring-pocket 33 is limited by means of an overflow-aperture 45. As the shaft 19 rotates the scoop is engaged by the driver 29 and passes with its mouth close to the bottom of the trough in the position shown in Fig. 1, scooping up a quantity of mercury into the compartment 32, and as the parts approach the position shown in Fig. 2 the mercury flows into the pocket 33, where the predetermined quantity is measured out, the surplus passing off through the aperture 45. When the scoop arrives at a position near the opening 15, it swings on its pivotal axis through the action of its weight and the weight of its contents until checked by the stop 28, finally assuming the position shown in Fig. 3 and discharging the contents of the pocket 33 through the opening 15 of the casing. A spring 30 in the top of the casing serves to engage the scoop and prevent same from tilting forward on its pivot until the shaft 19 has rotated sufficiently to bring the scoop into the position for discharging through the aperture 15. The elasticity of the driver 29 allows the scoop to yield to pass grit or the like on the surface of the trough.

In the modification shown in Figs. 6, 7, and 8 three scoops 34, 35, and 36 are mounted on the U-shaped spindle in the carrier 33 and are formed to move on said spindle independently of each other. The measuring-cups in this case differ in capacity, and their respective capacities are marked on an indicator-scale on the hood, as in Fig. 8. The discharging of these scoops is controlled by the gates 37, which extend through slots in the hood 14. These gates consist of L-shaped pieces. One leg of each is considerably shorter than the other and either leg being adapted to enter the slot in the hood. When the long leg is put through the slot, it engages the scoop and holds it in its retracted position inside of the discharging end of the trough 13. As shown in Figs. 7 and 8, the gates 37, corresponding to the one-half-pennyweight and the one-pennyweight scoops, have their long legs extending downward through the hood and preventing said scoops from falling into their discharging position. The gate corresponding to the one-fourth-pennyweight scoop has its long leg uppermost, and therefore does not interfere with the discharge of said scoop. When the long leg of a gate is out, it points toward the indicator and shows that the corresponding scoop is in operation. The idle scoops are free to revolve with the shaft 19, but are held by the gates 37 with their mouths 31 upwardly inclined, so that the contents of the measuring-cups 33 are not discharged.

In Figs. 9 and 10 the rods of a battery of stampers are indicated at 40, and the trough 13 is shown extending along one side of the mortar-boxes and having a plurality of hoods 14, each housing a set of feeding mechanism which is adapted to discharge mercury into the mortar-box 43. A single shaft 19 extends through the entire length of the trough 13 and operates all of the feeders. The shaft 19 is connected with the counter-shaft 20 by means of gearing housed in a gear-case 44. The shaft 20 is driven by a belt 22, passing over the pulley 21 and connected with other parts of the stamper mechanism. (Not shown.) In this way the speed of the feeders bears a fixed relation to the speed of the stamper. The quantity of mercury delivered to the mortar-boxes at each revolution of the shaft 19 is controlled by the number of feed-scoops which are permitted to operate and by the capacity of the various measuring-pockets 33.

The main features of the operation of the device shown will be readily understood from the foregoing description. It will be seen that to stop the operation of any one of the feeder-scoops it is merely necessary to set the corresponding gate 37 with its long leg extending inward of the hood, thereby forming a guide which prevents the feed-bucket from tilting to its discharging position. In case a certain feed-bucket is to be left out of use for a considerable length of time it is preferred to remove the same from the bracket 23 by pressing down the locking end 27' of the U-shaped spindle and shifting the same longitudinally to one side, as indicated in Fig. 5, thus withdrawing the pivot 26 and permitting the feed-bucket to be removed. To keep the remaining buckets in proper alinement with respect to the indicator, a washer of suitable thickness may be substituted for the bucket which has been removed.

It will be seen that numerous details of the construction shown may be altered without departing from the spirit of my invention.

What I claim as my invention, and desire to secure by Letters Patent, is—

1. In a device of the class described, the combination of a trough adapted to contain a liquid, a member movably mounted above the trough, a bucket pivotally mounted on said member and having communicating lifting and measuring compartments, a guide for causing said bucket to rotate on its pivotal axis through the movement of said member for raising liquid from the trough by means of the lifting-compartment, then causing the liquid to flow into the measuring-compartment and finally discharging the contents of the measuring-compartment over the edge of the trough, substantially as described.

2. In a device of the class described, the combination of a trough adapted to contain a liquid, a member rotatably mounted above the trough, a bucket pivotally mounted on said member, eccentrically of the same, said bucket having a peripherally-disposed lifting-compartment and a radially-disposed measuring-compartment communicating with each other, a guide for causing said bucket to rotate on its pivotal axis through the rotation of said member for raising liquid from the trough by means of the lifting-compartment, then causing the liquid to flow into the measuring-compartment and finally discharging the contents of the measuring-compartment over the edge of the trough, substantially as described.

3. In a device of the class described, the combination of a trough adapted to contain a liquid, a member rotatably mounted above the trough, a bucket pivotally mounted on said member, eccentrically of the same, said bucket having a peripherally-disposed lifting-compartment and a radially-disposed measuring-compartment communicating with each other, a guide for causing said bucket to rotate on its pivotal axis through the rotation of said member for raising liquid from the trough by means of the lifting-compartment, then causing the liquid to flow into the measuring-compartment and finally discharging the contents of the measuring-compartment over the edge of the trough, said measuring-compartment having in one side an overflow-aperture for limiting the quantity of liquid delivered by the bucket, substantially as described.

4. In a device of the class described, the combination of a trough adapted to contain a liquid, a shaft mounted above the trough and having thereon a revoluble arm, a bucket pivotally mounted on said arm eccentrically of the shaft, mechanism for causing said shaft to rotate continuously in one direction, and means controlling the pivotal movement of said bucket whereby, during a part of the revolution of the arm, said bucket will be caused to scoop liquid from the trough and retain the liquid, said bucket being adapted to tilt on its pivotal axis and extend outwardly for discharging its contents over the edge of the trough during another part of the revolution of the arm, substantially as described.

5. In a device of the class described, the combination of a trough adapted to contain a liquid; a shaft journaled above said trough, an arm secured to said shaft; a bucket pivotally mounted on said arm; a wall at one side of said shaft; and guiding means controlling the pivotal movement of said bucket and adapted through the continuous revolution of said arm to cause the bucket to alternately scoop liquid from said trough and discharge the same over said wall, substantially as described.

6. In a device of the class described, the combination of a casing of substantially circular cross-section, open at one side and adapted to contain a liquid; a shaft journaled concentrically within said casing; a transversely-disposed arm secured to the shaft; means for rotating the shaft; a bucket having an open mouth and being pivotally mounted on said arm, said bucket being adapted during the rotation of said arm to engage the inner surface of said casing and move across the bottom of the casing with one edge of its mouth close to such bottom for scooping up liquid therefrom; and means for causing said bucket to tilt forward and discharge its contents through said opening when it arrives at a certain position near the opening, substantially as described.

7. In a device of the class described, the combination of a casing of substantially circular cross-section, open at one side and adapted to contain a liquid; a shaft journaled concentrically within said casing and having a transversely-disposed arm rotatable therewith; means for rotating the shaft; a bucket having an open mouth and being pivotally mounted on said arm; said bucket being adapted during the rotation of said arm to engage the inner surface of said casing in suitable manner to cause the bucket to move across the bottom of the casing with one edge of its mouth close to such bottom for scooping up liquid therefrom; the pivotal axis of said bucket being suitably located to cause the bucket to be tilted forward under the action of gravity and discharge its contents through said opening when it arrives at a position near the opening; and a stop on the arm for limiting the pivotal movement of the bucket, substantially as described.

8. In a device of the class described, the combination of a casing of substantially circular transverse cross-section; open at one side, and adapted to contain a liquid; a shaft journaled concentrically within said casing and having a transversely-disposed arm rotatable therewith; a bucket having an open mouth and being pivotally mounted on said arm and adapted through engagement with the inner wall of the casing to move along with its mouth near the bottom of the casing for scooping up a liquid; and a stop on said arm adapted to engage the bucket and hold the same against the casing during its passage along the bottom of the same, said stop being adapted to yield to permit the bucket to ride over grit or particles of foreign matter on the surface of the casing, substantially as described.

9. In a device of the class described, the combination of a trough adapted to contain a liquid; a shaft journaled above said trough and having thereon a rotating arm; a bucket pivotally mounted on said arm; means controlling the pivotal movement of said bucket whereby during part of the rotation of the arm, said bucket will be caused to scoop liquid from the trough and retain the liquid; means for causing said bucket to tilt on its pivotal axis and extend outwardly for discharging its contents over the edge of the trough, when said arm is rotated to a certain position; and means adapted to be moved across the path of the bucket for preventing said bucket from tilting and discharging its contents, substantially as described.

10. In a device of the class described, the combination of a casing open at one side and adapted to contain a liquid; a shaft journaled within said casing and having thereon a transversely-disposed arm rotatable therewith; a plurality of buckets pivotally mounted on said arm and adapted to scoop liquid from the casing; means for causing said buckets to tilt forward and discharge their contents through said opening upon their arrival at a certain position near the opening; independent means movable across the path of each of said buckets for preventing the same from discharging its contents through the opening, substantially as described.

11. In a device of the class described, the combination of a casing, open at one side and adapted to contain liquid; a shaft journaled within said casing and having thereon a transversely-disposed arm rotatable therewith; a plurality of buckets pivotally mounted on said arm and adapted to scoop liquid from the casing; means for causing said buckets to tilt forward and discharge their contents through said opening upon their arrival at a certain position near the opening; means within the casing for independently preventing each of said buckets from discharging its contents through the opening, and means outside of the casing adapted to indicate which of said buckets are free to operate substantially as described.

In testimony whereof I have signed my name to this specification in the presence of two subscribing witnesses.

N. P. CARVER.

Witnesses:
PERCY NEWELL,
M. J. CANDRICK.